United States Patent
Sato et al.

(10) Patent No.: US 6,689,495 B1
(45) Date of Patent: *Feb. 10, 2004

(54) MAGNETIC RECORDING MEDIUM AND MAGNETIC STORAGE APPARATUS

(75) Inventors: Hisateru Sato, Kawasaki (JP); Isatake Kaitsu, Kawasaki (JP); E. Noel Abarra, Kawasaki (JP); Iwao Okamoto, Kawasaki (JP); Yoshifumi Mizoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 24 days.

This patent is subject to a terminal disclaimer.

(21) Appl. No.: 09/588,451

(22) Filed: Jun. 6, 2000

Related U.S. Application Data (63) Continuation-in-part of application No. 09/425,788, filed on Oct. 22, 1999.

(30) Foreign Application Priority Data

Jun. 8, 1999 (JP) .......................................... 11-161329
Apr. 7, 2000 (JP) ...................................... 2000-107072

(51) Int. Cl.$^7$ ............................. G11B 5/66; G11B 5/70; H01F 1/00; B32B 15/00
(52) U.S. Cl. .............................. 428/694 TM; 428/336; 428/611; 428/668; 428/900
(58) Field of Search .................... 428/694 TM, 694 TS, 428/900, 336, 694 EC, 611, 668

(56) References Cited

U.S. PATENT DOCUMENTS

| | | |
|---|---|---|
| 4,667,032 A | 6/1987 | Robinson ..................... 428/611 |
| 5,051,288 A | 9/1991 | Ahlert et al. ................ 428/641 |
| 5,147,732 A | 9/1992 | Shiroishi et al. ............ 428/668 |

(List continued on next page.)

FOREIGN PATENT DOCUMENTS

| | | |
|---|---|---|
| DE | 197 00 506 A1 | 7/1997 |
| EP | 0892393 A1 | 1/1999 |
| GB | 2355018 A | 4/2001 |

(List continued on next page.)

OTHER PUBLICATIONS

Akopyan et al., "Study Of A Change In The Lattice Constant Of A Ruthenium–Based Ternary Solid Solution By Mathematical Planning Of An Experiment," Izv. Akad. Nauk SSR, Met., (1976) (3), 210–214.

Ounadjela et al., "Field–Dependent Antiferro–Ferromagnetic Transition In Co/Ru Superlattices," J. Appl. Phys., Nov. 15, 1991, vol. 70, Issue 10, p. 5877.

S.E. Lambert, et al., "Reducation of Media Noise in Thin Film Metal Media by Lamination"—IEEE Transactions on Magnetics, vol. 26, No. 5, Sep. 1990, pp. 2706–2708.

E.S. Murdock, et al., "Noise Properties of Multilayered Co-Alloy Magnetic Recording Media"—IEEE Transactions on Magnetics, vol. 26, No. 5, Sep. 1990, pp. 2700–2705.

A. Murayama, et al., "Interlayer Exchange Coupling in Co/Cr/Co Double Layered Recording Films Studied by Spin–Wave Brillouin Scattering" —IEEE Transactions on Magnetics, vol. 27, No. 6, Nov. 1991, pp. 5064–5066.

(List continued on next page.)

*Primary Examiner*—Holly Rickman
(74) *Attorney, Agent, or Firm*—Greer, Burns & Crain, Ltd.

(57) ABSTRACT

A magnetic recording medium is constructed to include at least one exchange layer structure and a magnetic layer provided on the exchange layer structure. The exchange layer structure includes a ferromagnetic layer and a non-magnetic coupling layer provided on the ferromagnetic layer. At least one of the ferromagnetic layer and the magnetic layer has a granular layer structure in which ferromagnetic crystal grains are uniformly distributed within a non-magnetic base material.

13 Claims, 8 Drawing Sheets

U.S. PATENT DOCUMENTS

| | | | |
|---|---|---|---|
| 5,408,377 A | 4/1995 | Gurney et al. | 360/113 |
| 5,462,796 A | 10/1995 | Teng et al. | 428/336 |
| 5,465,185 A | 11/1995 | Heim et al. | 360/113 |
| 5,493,465 A | 2/1996 | Kamiguchi et al. | 360/113 |
| 5,523,173 A | 6/1996 | Doerner et al. | 428/611 |
| 5,580,667 A | 12/1996 | Lal et al. | 428/610 |
| 5,607,740 A | 3/1997 | Noda | 428/65.3 |
| 5,688,380 A | 11/1997 | Koike et al. | 204/192.1 |
| 5,693,426 A | 12/1997 | Lee et al. | 428/611 |
| 5,701,223 A | 12/1997 | Fontana, Jr. et al. | 360/113 |
| 5,736,262 A * | 4/1998 | Ohkijima et al. | 428/611 |
| 5,756,202 A | 5/1998 | Van Kesteren et al. | 428/332 |
| 5,834,111 A | 11/1998 | Lal et al. | 428/332 |
| 5,840,394 A * | 11/1998 | Ranjan et al. | 428/65.3 |
| 4,789,598 A | 12/1998 | Howard et al. | 428/408 |
| 5,843,569 A | 12/1998 | Kaitsu et al. | 428/323 |
| 5,851,643 A | 12/1998 | Honda et al. | 428/212 |
| 5,851,656 A | 12/1998 | Ohkubo | 428/332 |
| 5,898,549 A | 4/1999 | Gill | 360/113 |
| 5,922,456 A | 7/1999 | Tanahashi et al. | 428/332 |
| 6,013,365 A | 1/2000 | Dieny et al. | 428/332 |
| 6,077,586 A | 6/2000 | Bian et al. | 428/65.3 |
| 6,143,388 A | 11/2000 | Bian et al. | 428/65.3 |
| 6,150,016 A * | 11/2000 | Song et al. | 428/332 |
| 6,221,481 B1 | 4/2001 | Wu et al. | 428/332 |
| 6,248,395 B1 * | 6/2001 | Homola et al. | 427/129 |
| 6,280,813 B1 * | 8/2001 | Carey et al. | 428/65.3 |
| 2001/0038931 A1 | 11/2001 | Carey et al. | 428/694 |

FOREIGN PATENT DOCUMENTS

| | | |
|---|---|---|
| JP | 6-349047 | 12/1994 |
| JP | 7-121863 | 5/1995 |
| JP | 07-134820 | 5/1995 |
| JP | 07-176027 | 7/1995 |
| JP | 08-129738 | 5/1996 |
| JP | 09-147349 | 6/1997 |
| JP | 9-198641 | 7/1997 |
| JP | 10-149526 A | 6/1998 |
| JP | 10-289434 | 10/1998 |
| JP | 1173621 | 3/1999 |
| JP | 11328646 A | 11/1999 |
| WO | WO9624927 | 8/1996 |
| WO | WO9734295 | 9/1997 |

OTHER PUBLICATIONS

S.E. Lambert, et al., "Laminated Media for High Density Recording"—IEEE Transactions on Magnetics, vol. 29, No. 1, Jan. 1993, pp. 223–229.

E. Teng, et al., "Flash Chromium Interlayer for High Performance Disks with Superior Noise and Coercivity Squareness"—IEEE Transactions on Magnetics, vol. 29, No. 6, Nov. 1993, pp. 3679–3681.

S.S.P. Parkin et al., "Oscillations in Exchange Couplng and Magnetoresistance in Metallic Superlattice Structures: Co/Ru, Co/Cr, and Fe/Cr", Physical Review Letters, vol. 64, No. 19, May 7, 1990, pp. 2304–2307.

Okamoto et al.; "Rigid Disk Medium for 5 Gb/in$^2$ Recording;" IEEE Intermag 1996 Digest.

Hosoe et al.; "Experimental Study of Thermal Decay in High–Density Magnetic Recording Media;" IEEE Trans. Magn.; vol. 33, p. 1528; 1997.

Lu et al.; "Thermal Instability at 10 Gb/in$^2$ Magnetic Recording;" IEEE Trans. Magn.; vol. 30, No. 6, pp. 4230–4232; Nov. 1994.

Abarra et al.; "Thermal Stability of Narrow Track Bits in a 5 Gb/in$^2$ Medium;" IEEE Trans. Magn.; vol. 33, p. 2995; 1997.

He et al.; "High–Speed Switching in Magnetic Recording Media;" Journal of Magnetism and Magnetic Materials; vol. 155, pp. 6–12; 1996.

Akimoto et al., "Relationship Between Magnetic Circumferential Orientation and Magnetic Thermal Stability;" J. Magn. Magn. Mater.; 1999.

Abarra et al.; "The Effect of Orientation Ratio on the Dynamic Coercivity of Media for >15 5 Gb/in$^2$ Recording;" EB–02, Intermag.; Korea; 1999.

Richter et al.; "Dynamic Coercivity Effects in Thin Film Media;" IEEE Trans. Magn., vol. 34, p. 1540; 1997.

Lu et al.; "Magnetic Viscosity in High–Density Recording;" J. Appl. Phys., vol. 75, p. 5768; 1994.

S.S.P. Parkin; "Systematic Variation of the Strength and Oscillation Period of Indirect Magnetic Exchange Coupling Through the 3d, 4d, and 5d Transition Metals;" Phys. Rev. Lett., vol. 67, p. 3598; 1991.

Pu–Ling Lu and Stanley H. Charap; "High Density Magnetic Recording Media Design and Identification: Susceptibility to Thermal Decay;" IEEE Transactions on Magnetics, vol. 31, No. 6; Nov. 1995.

Y. Kawato et al.; "Spin Valve Films with Synthetic Ferrimagnets (Co/Ru/Co) for Pinned Layers;" (source and year unknown).

Baibich et al., "Giant Magnetoresistance of (001)Fe(001)CR Magnetic Superlattices," Physical Review Letters, vol. 61, Nov. 21, No. 21, 1988.

* cited by examiner

MAGNETIC RECORDING MEDIUM AND MAGNETIC STORAGE APPARATUS

This application is a Continuation-In-Part Application of a U.S. patent application Ser. No. 09/425,788 pending filed Oct. 22, 1999.

BACKGROUND OF THE INVENTION

1. Field of the Invention

The present invention generally relates to magnetic recording media and magnetic storage apparatuses, and more particularly to a magnetic recording medium and a magnetic storage apparatus which are suited for high-density recording.

2. Description of the Related Art

Due to the development of the information processing technology, there are increased demands for high-density magnetic recording media. Characteristics required of the magnetic recording media to satisfy such demands include low noise, high coercivity, high remanence magnetization, and high resolution in the case of a hard disk, for example.

The recording density of longitudinal magnetic recording media, such as magnetic disks, has been increased considerably, due to the reduction of medium noise and the development of magnetoresistive and high-sensitivity spin-valve heads. A typical magnetic recording medium is comprised of a substrate, an underlayer, a magnetic layer, and a protection layer which are successively stacked in this order. The underlayer is made of Cr or a Cr-based alloy, and the magnetic layer is made of a Co-based alloy.

Various methods have been proposed to reduce the medium noise. For example, Okamoto et al., "Rigid Disk Medium For 5 Gbit/in$^2$ Recording", AB-3, Intermag '96 Digest proposes decreasing the grain size and size distribution of the magnetic layer by reducing the magnetic layer thickness by the proper use of an underlayer made of CrMo, and a U.S. Pat. No. 5,693,426 proposes the use of an underlayer made of NiAl. Further, Hosoe et al., "Experimental Study of Thermal Decay in High-Density Magnetic Recording Media", IEEE Trans. Magn. Vol.33, 1528 (1997), for example, proposes the use of an underlayer made of CrTiB. The underlayers described above also promote c-axis orientation of the magnetic layer in a plane which increases the remanence magnetization and the thermal stability of written bits. In addition, proposals have been made to reduce the thickness of the magnetic layer, to increase the resolution or to decrease the width of transition between written bits. Furthermore, proposals have been made to decrease the exchange coupling between grains by promoting more Cr segregation in the magnetic layer which is made of the CoCr-based alloy.

However, as the grains of the magnetic layer become smaller and more magnetically isolated from each other, the written bits become unstable due to thermal activation and to demagnetizing fields which increase with linear density. Lu et al., "Thermal Instability at 10 Gbit/in$^2$ Magnetic Recording", IEEE Trans. Magn. Vol.30, 4230 (1994) demonstrated, by micromagnetic simulation, that exchange-decoupled grains having a diameter of 10 nm and ratio $K_u V/k_B T \sim 60$ in 400 kfci di-bits are susceptible to significant thermal decay, where $K_u$ denotes the magnetic anisotropy constant, V denotes the average magnetic grain volume, $k_B$ denotes the Boltzmann constant, and T denotes the temperature. The ratio $K_u V/k_B T$ is also referred to as a thermal stability factor.

It has been reported in Abarra et al., "Thermal Stability of Narrow Track Bits in a 5 Gbit/in$^2$ Medium", IEEE Trans. Magn. Vol.33, 2995 (1997) that the presence of intergranular exchange interaction stabilizes written bits, by MFM studies of annealed 200 kfci bits on a 5 Gbit/in$^2$ CoCrPtTa/CrMo medium. However, more grain decoupling is essential for recording densities of 20 Gbit/in$^2$ or greater.

The obvious solution has been to increase the magnetic anisotropy of the magnetic layer. But unfortunately, the increased magnetic anisotropy places a great demand on the head write field which degrades the "overwrite" performance which is the ability to write over previously written data.

In addition, the coercivity of thermally unstable magnetic recording medium increases rapidly with decreasing switching time, as reported in He et al., "High Speed Switching in Magnetic Recording Media", J. Magn. Magn. Mater. Vol.155, 6 (1996), for magnetic tape media, and in J. H. Richter, "Dynamic Coervicity Effects in Thin Film Media", IEEE Trans. Magn. Vol.34, 1540 (1997), for magnetic disk media. Consequently, the adverse effects are introduced in the data rate, that is, how fast data can be written on the magnetic layer and the amount of head field required to reverse the magnetic grains.

On the other hand, another proposed method of improving the thermal stability increases the orientation ratio of the magnetic layer, by appropriately texturing the substrate under the magnetic layer. For example, Akimoto et al., "Relationship Between Magnetic Circumferential Orientation and Magnetic Thermal Stability", J. Magn. Magn. Mater. (1999), in press, report through micromagnetic simulation, that the effective ratio $K_u V/k_B T$ is enhanced by a slight increase in the orientation ratio. This further results in a weaker time dependence for the coercivity which improves the overwrite performance of the magnetic recording medium, as reported in Abarra et al., "The Effect of Orientation Ratio on the Dynamic Coercivity of Media for >15 Gbit/in$^2$ Recording", EB-02, Intermag '99, Korea.

Furthermore, keepered magnetic recording media have been proposed for thermal stability improvement. The keeper layer is made up of a magnetically soft layer parallel to the magnetic layer. This soft layer can be disposed above or below the magnetic layer. Oftentimes, a Cr isolation layer is interposed between the soft layer and the magnetic layer. The soft layer reduces the demagnetizing fields in written bits on the magnetic layer. However, coupling the magnetic layer to a continuously-exchanged coupled soft layer defeats the purpose of decoupling the grains of the magnetic layer. As a result, the medium noise increases.

Various methods have been proposed to improve the thermal stability and to reduce the medium noise. However, there was a problem in that the proposed methods do not provide a considerable improvement of the thermal stability of written bits, thereby making it difficult to greatly reduce the medium noise. In addition, there was another problem in that some of the proposed methods introduce adverse effects on the performance of the magnetic recording medium due to the measures taken to reduce the medium noise.

More particularly, in order to obtain a thermally stable performance of the magnetic recording medium, it is conceivable to (i) increase the magnetic anisotropy constant $K_u$, (ii) decrease the temperature T or, (iii) increase the grain volume V of the magnetic layer. However, measure (i) increases the coercivity, thereby making it more difficult to write information on the magnetic layer. In addition, measure (ii) is impractical since in magnetic disk drives, for example, the operating temperature may become greater than 60° C. Furthermore, measure (iii) increases the medium noise as described above. As an alternative for measure (iii), it is conceivable to increase the thickness of the magnetic layer, but this would lead to deterioration of the resolution.

SUMMARY OF THE INVENTION

Accordingly, it is a general object of the present invention to provide a novel and useful magnetic recording medium and magnetic storage apparatus, in which the problems described above are eliminated.

Another and more specific object of the present invention is to provide a magnetic recording medium and a magnetic storage apparatus, which can improve the thermal stability of written bits without increasing the medium noise, so as to enable a reliable high-density recording without introducing adverse effects on the performance of the magnetic recording medium, that is, unnecessarily increasing the magnetic anisotropy.

Still another object of the present invention is to provide a magnetic recording medium comprising at least one exchange layer structure and a magnetic layer provided on the exchange layer structure, where the exchange layer structure includes a ferromagnetic layer and a non-magnetic coupling layer provided on the ferromagnetic layer, at least one of the ferromagnetic layer and the magnetic layer has a granular layer structure in which ferromagnetic crystal grains are uniformly distributed within a non-magnetic base material. According to the magnetic recording medium of the present invention, it is possible to provide a magnetic recording medium which can improve the thermal stability of written bits, so as to enable reliable high-density recording without degrading the overwrite performance. By employing the granular layer structure which is effective in reducing noise for at least the ferromagnetic layer of the exchange layer structure and the magnetic layer which is provided on the exchange layer structure, it is possible to further reduce the medium noise while further improving the thermal stability of the written bits.

The magnetic recording medium may comprise at least a first exchange layer structure and a second exchange layer structure provided between the first exchange layer structure and the magnetic layer, where the first and second exchange layer structures have a granular layer structure, the second exchange layer structure has a granular layer with a magnetic anisotropy smaller than that of a granular layer of the first exchange layer structure, and the granular layers of the first and second exchange layer structures have magnetization directions which are mutually antiparallel.

The magnetic recording medium may comprise at least a first exchange layer structure and a second exchange layer structure provided between the first exchange layer structure and the magnetic layer, where the first and second exchange layer structures have a granular layer structure, the second exchange layer structure has a granular layer with a remanence magnetization and thickness product smaller than that of a granular layer of the first exchange layer structure, and the granular layers of the first and second exchange layer structures have magnetization directions which are mutually antiparallel.

A further object of the present invention is to provide a magnetic storage apparatus comprising at least one magnetic recording medium of any of the types described above. According to the magnetic storage apparatus of the present invention, it is possible to provide a magnetic recording medium which can improve the thermal stability of written bits, so as to enable reliable high-density recording without degrading the overwrite performance.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention.

The present invention submits the use of layers with antiparallel magnetization structures. For example, S. S. P. Parkin, "Systematic Variation of the Strength and Oscillation Period of Indirect Magnetic Exchange Coupling through the $3d$, $4d$, and $5d$ Transition Metals", Phys. Rev. Lett. Vol. 67, 3598 (1991) describes several magnetic transition metals such as Co, Fe and Ni that are coupled through thin non-magnetic interlayers such as Ru and Rh. On the other hand, U.S. Pat. No. 5,701,223 proposes a spin-valve which employs the above described layers as laminated pinning layers to stabilize the sensor.

For a particular Ru or Ir layer thickness between two ferromagnetic layers, the magnetizations can be made parallel or antiparallel. For example, for a structure made up of two ferromagnetic layers of different thickness with antiparallel magnetizations, the effective grain size of a magnetic recording medium can be increased without significantly affecting the resolution. A signal amplitude reproduced from such a magnetic recording medium is reduced due to the opposite magnetizations, but this can be rectified by adding another layer of appropriate thickness and magnetization direction, under the laminated magnetic layer structure, to thereby cancel the effect of one of the layers. As a result, it is possible to increase the signal amplitude reproduced from the magnetic recording medium, and to also increase the effective grain volume. Thermally stable written bits can therefore be realized.

The present invention increases the thermal stability of written bits by exchange coupling the magnetic layer to another ferromagnetic layer with an opposite magnetization, or by a laminated ferromagnetic structure. The ferromagnetic layer or the laminated ferromagnetic structure is made up of exchange-decoupled grains as the magnetic layer. In other words, the present invention uses an exchange pinning ferromagnetic layer or a ferromagnetic multiplayer to improve the thermal stability performance of the magnetic recording medium.

Figure 1:
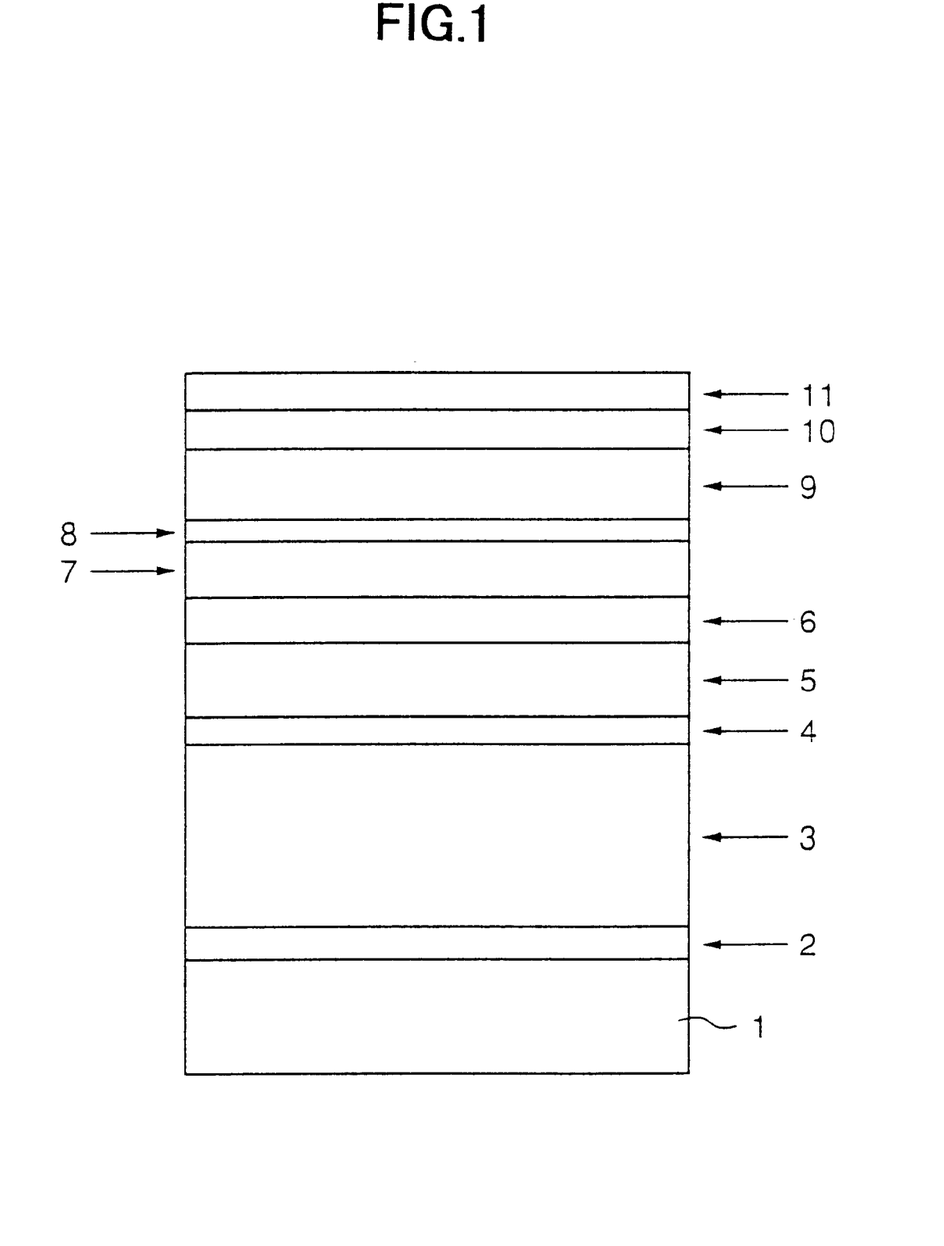
FIG. 1 is a cross sectional view showing an important part of a first embodiment of the magnetic recording medium according to the present invention.

FIG. 1 is a cross sectional view showing an important part of a first embodiment of a magnetic recording medium according to the present invention.

The magnetic recording medium includes a non-magnetic substrate 1, a first seed layer 2, a NiP layer 3, a second seed layer 4, an underlayer 5, a non-magnetic intermediate layer 6, a ferromagnetic layer 7, a non-magnetic coupling layer 8, a magnetic layer 9, a protection layer 10, and a lubricant layer 11 which are stacked in the order shown in FIG. 1.

For example, the non-magnetic substrate 1 is made of Al, Al alloy or glass. This non-magnetic substrate 1 may or may not be mechanically textured. The first seed layer 2 is made of Cr or Ti, for example, especially in the case where the non-magnetic substrate 1 is made of glass. The NiP layer 3 is preferably oxidized and may or may not be mechanically textured. The second seed layer 4 is provided to promote a (001) or a (112) texture of the underlayer 5 when using a B2 structure alloy such as NiAl and FeAl for the underlayer 5. The second seed layer 4 is made of an appropriate material similar to that of the first seed layer 2.

In a case where the magnetic recording medium is a magnetic disk, the mechanical texturing provided on the non-magnetic substrate 1 or the NiP layer 3 is made in a circumferential direction of the disk, that is, in a direction in which tracks of the disk extend.

The non-magnetic intermediate layer 6 is provided to further promote epitaxy, narrow the grain distribution of the magnetic layer 9, and orient the anisotropy axes of the magnetic layer 9 along a plane parallel to the recording surface of the magnetic recording medium. This non-magnetic intermediate layer 6 is made of a hcp structure alloy such as CoCr—M, where M=B, Mo, Nb, Ta, W or alloys thereof, and has a thickness in a range of 1 to 5 nm.

The ferromagnetic layer 7 is made of Co, Ni, Fe, Co-based alloy, Ni-based alloy, Fe-based alloy or the like. In other words, alloys such as CoCrTa, CoCrPt and CoCrPt—M, where M=B, Mo, Nb, Ta, W, Cu or alloys thereof may be used for the ferromagnetic layer 7. This ferromagnetic layer 7 has a thickness in a range of 2 to 10 nm. The non-coupling magnetic layer 8 is made of Ru, Ir, Rh, Ru-based alloy, Ir-based alloy, Rh-based alloy or the like. This non-magnetic coupling layer 8 preferably has a thickness in a range of 0.4 to 1.0 nm, and preferably approximately 0.8 nm. For this particular thickness range of the non-magnetic coupling layer 8, the magnetizations of the ferromagnetic layer 7 and the magnetic layer 9 are antiparallel. The ferromagnetic layer 7 and the non-magnetic coupling layer 8 form an exchange layer structure.

The magnetic layer 9 is made of Co or a Co-based alloys such as CoCrTa, CoCrPt and CoCrPt—M, where M=B, Mo, Nb, Ta, W, Cu or alloys thereof. The magnetic layer 9 has a thickness in a range of 5 to 30 nm. Of course, the magnetic layer 9 is not limited to a single-layer structure, and a multi-layer structure may be used for the magnetic layer 9.

The protection layer 10 is made of C, for example. In addition, the lubricant layer 11 is made of an organic lubricant, for example, for use with a magnetic transducer such as a spin-valve head. The protection layer 10 and the lubricant layer 11 form a protection layer structure on the recording surface of the magnetic recording medium.

Obviously, the layer structure under the exchange layer structure is not limited to that shown in FIG. 1. For example, the underlayer 5 may be made of Cr or Cr-based alloy and formed to a thickness in a range of 5 to 40 nm on the substrate 1, and the exchange layer structure may be provided on this underlayer 5.

Next, a description will be given of a second embodiment of the magnetic recording medium according to the present invention.

Figure 2:
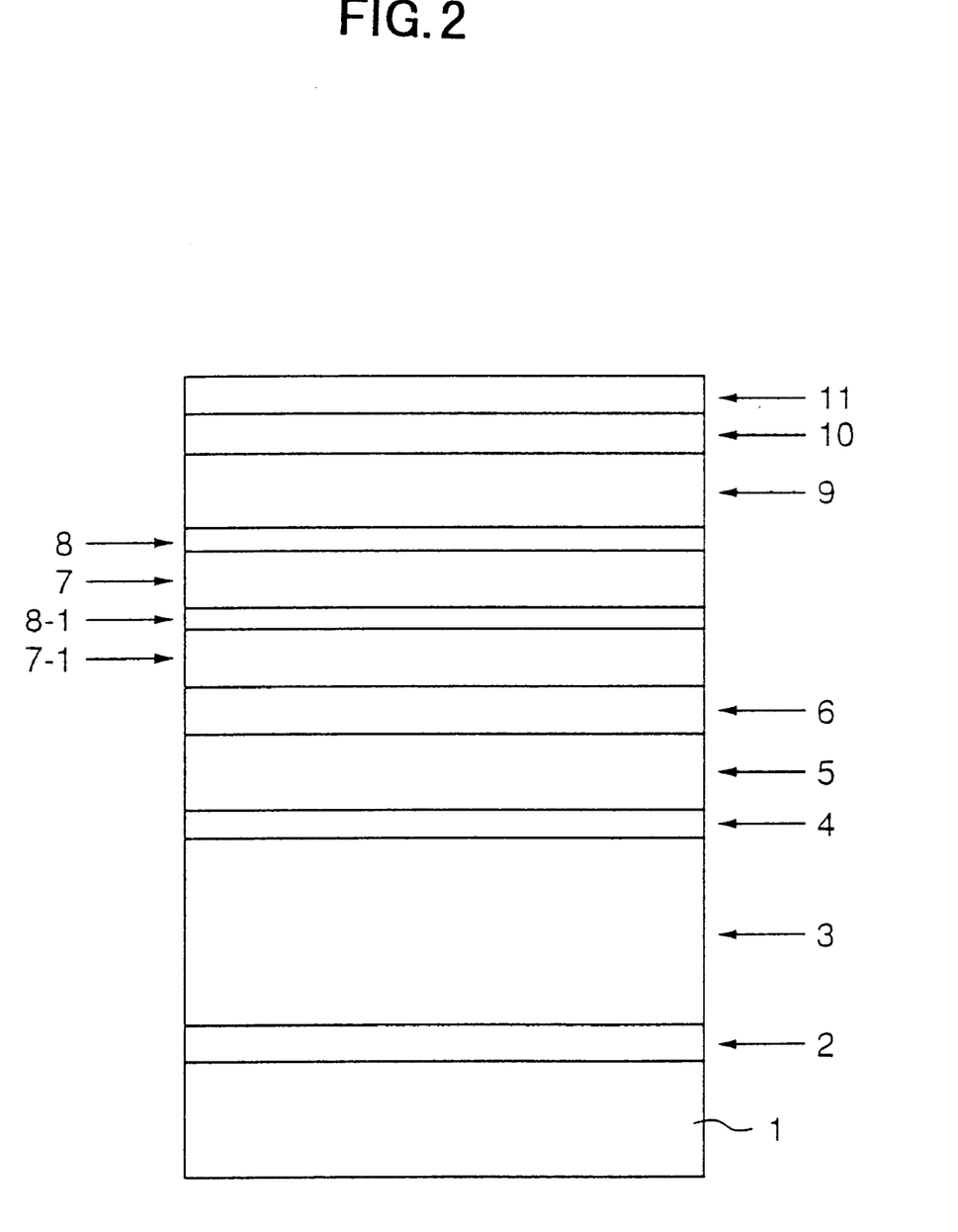
FIG. 2 is a cross sectional view showing an important part of a second embodiment of the magnetic recording medium according to the present invention.

FIG. 2 is a cross sectional view showing an important part of the second embodiment of the magnetic recording medium. In FIG. 2, those parts which are the same as those corresponding parts in FIG. 1 are designated by the same reference numerals, and a description thereof will be omitted.

In this second embodiment of the magnetic recording medium, the exchange layer structure includes two non-magnetic coupling layers 8 and 8-1, and two ferromagnetic layers 7 and 7-1, which form a ferrimagnetic multilayer. This arrangement increases the effective magnetization and signal, since the magnetizations of the two non-magnetic coupling layers 8 and 8-1 cancel each other instead of a portion of the magnetic layer 9. As a result, the grain volume and thermal stability of magnetization of the magnetic layer 9 are effectively increased. More bilayer structures made up of the pair of ferromagnetic layer and nonmagnetic coupling layer may be provided additionally to increase the effective grain volume, as long as the easy axis of magnetization are appropriately oriented for the subsequently provided layers.

The ferromagnetic layer 7-1 is made of a material similar to that of ferromagnetic layer 7, and has a thickness range selected similarly to the ferromagnetic layer 7. In addition, the nonmagnetic coupling layer 8-1 is made of a material similar to that of the non-magnetic coupling layer 8, and has a thickness range selected similarly to the non-magnetic coupling layer 8. Within the ferromagnetic layers 7-1 and 7, the c-axes are preferably in-plane and the grain growth columnar.

In this embodiment, the magnetic anisotropy of the ferromagnetic layer 7-1 is preferably higher than that of the ferromagnetic layer 7. However, the magnetic anisotropy of the ferromagnetic layer 7-1 may be the same as or, be higher than that of, the magnetic layer 9.

Furthermore, a remanence magnetization and thickness product of the ferromagnetic layer 7 may be smaller than that of the ferromagnetic layer 7-1.

Figure 3:
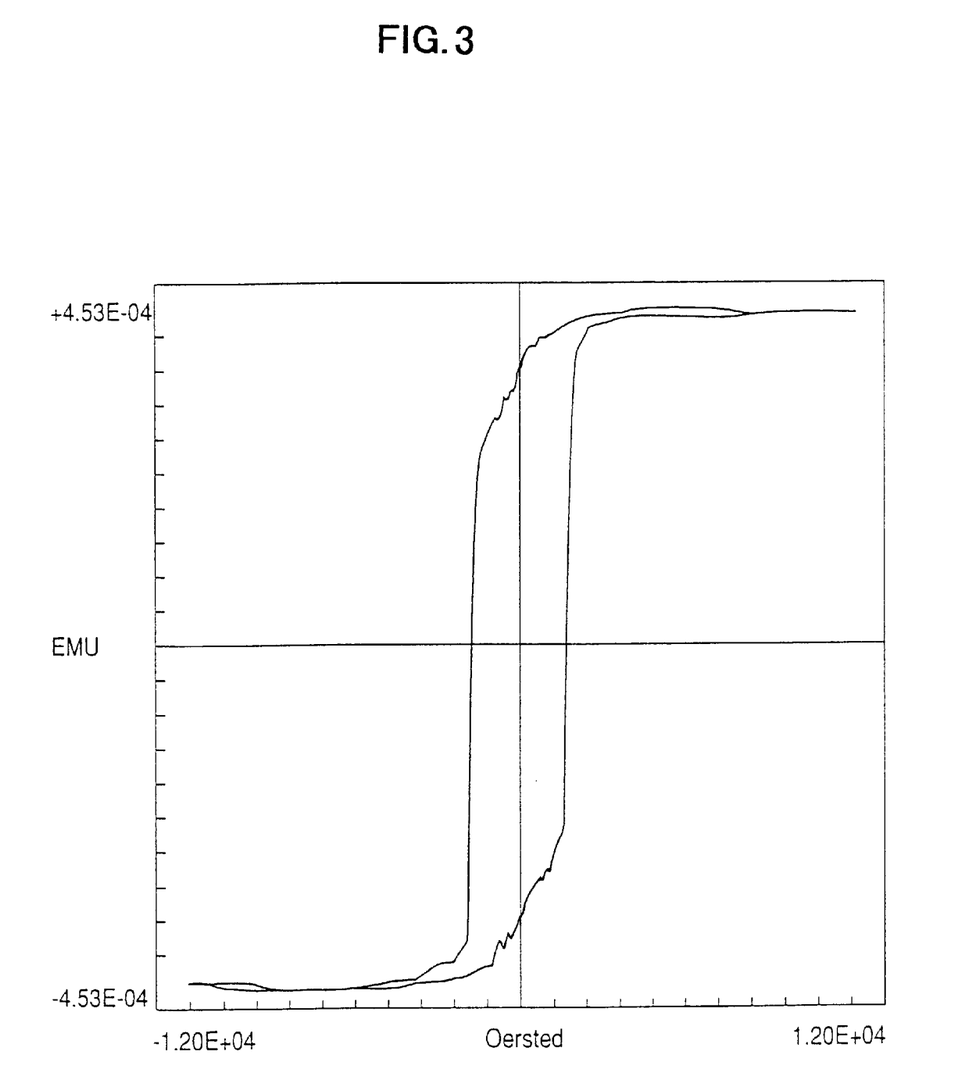
FIG. 3 is a diagram showing an in-plane magnetization curve of a single CoPt layer having a thickness of 10 nm on a Si substrate.

FIG. 3 is a diagram showing an in-plane magnetization curve of a single CoPt layer having a thickness of 10 nm on a Si substrate. In FIG. 3, the ordinate indicates the magnetization (emu), and the abscissa indicates the magnetic field (Oe). Conventional magnetic recording media show a behavior similar to that shown in FIG. 3.

Figure 4:
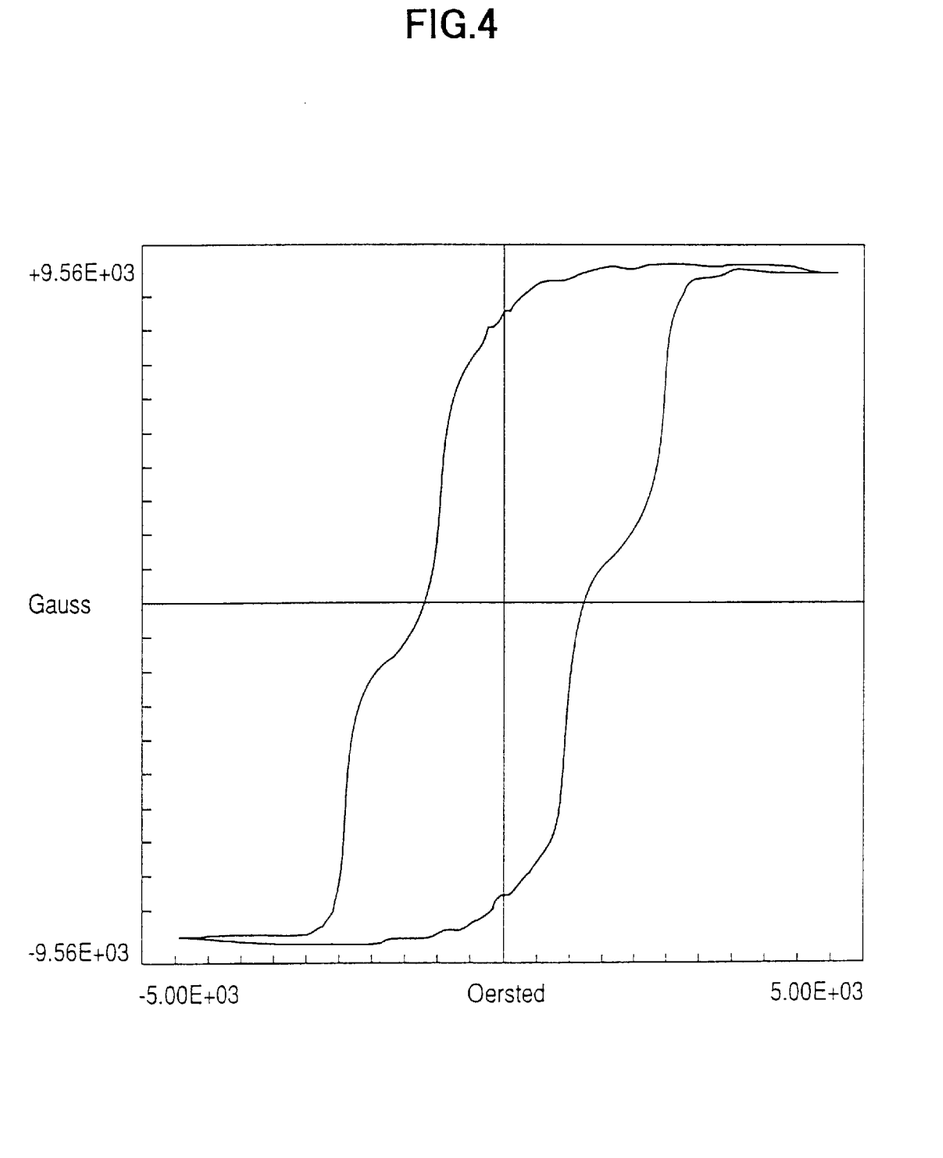
FIG. 4 is a diagram showing an in-plane magnetization curve of two CoPt layers separated by a Ru layer having a thickness of 0.8 nm.

FIG. 4 is a diagram showing an in-plane magnetization curve of two CoPt layers separated by a Ru layer having a thickness of 0.8 nm, as in the case of the first embodiment of the magnetic recording medium. In FIG. 4, the ordinate indicates the magnetization (Gauss), and the abscissa indicates the magnetic field (Oe). As may be seen from FIG. 4, the loop shows shifts near the magnetic field which indicate the antiparallel coupling.

Figure 5:
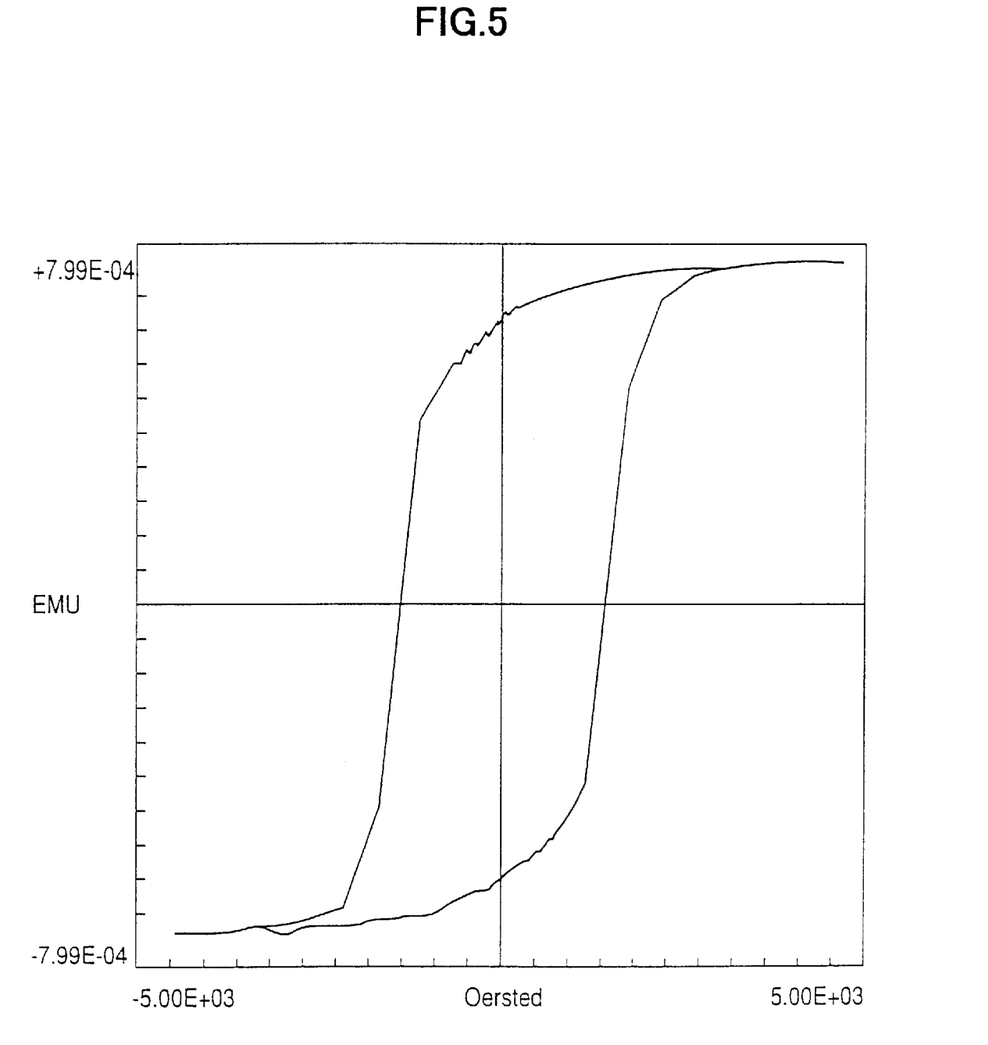
FIG. 5 is a diagram showing an in-plane magnetization curve of two CoPt layers separated by a Ru layer having a thickness of 1.4 nm.

FIG. 5 is a diagram showing an in-plane magnetization curve of two CoPt layers separated by a Ru layer having a thickness of 1.4 nm. In FIG. 5, the ordinate indicates the magnetization (emu), and the abscissa indicates the magnetic field (Oe). As may be seen from FIG. 5, the magnetizations of the two CoPt layers are parallel.

Figure 6:
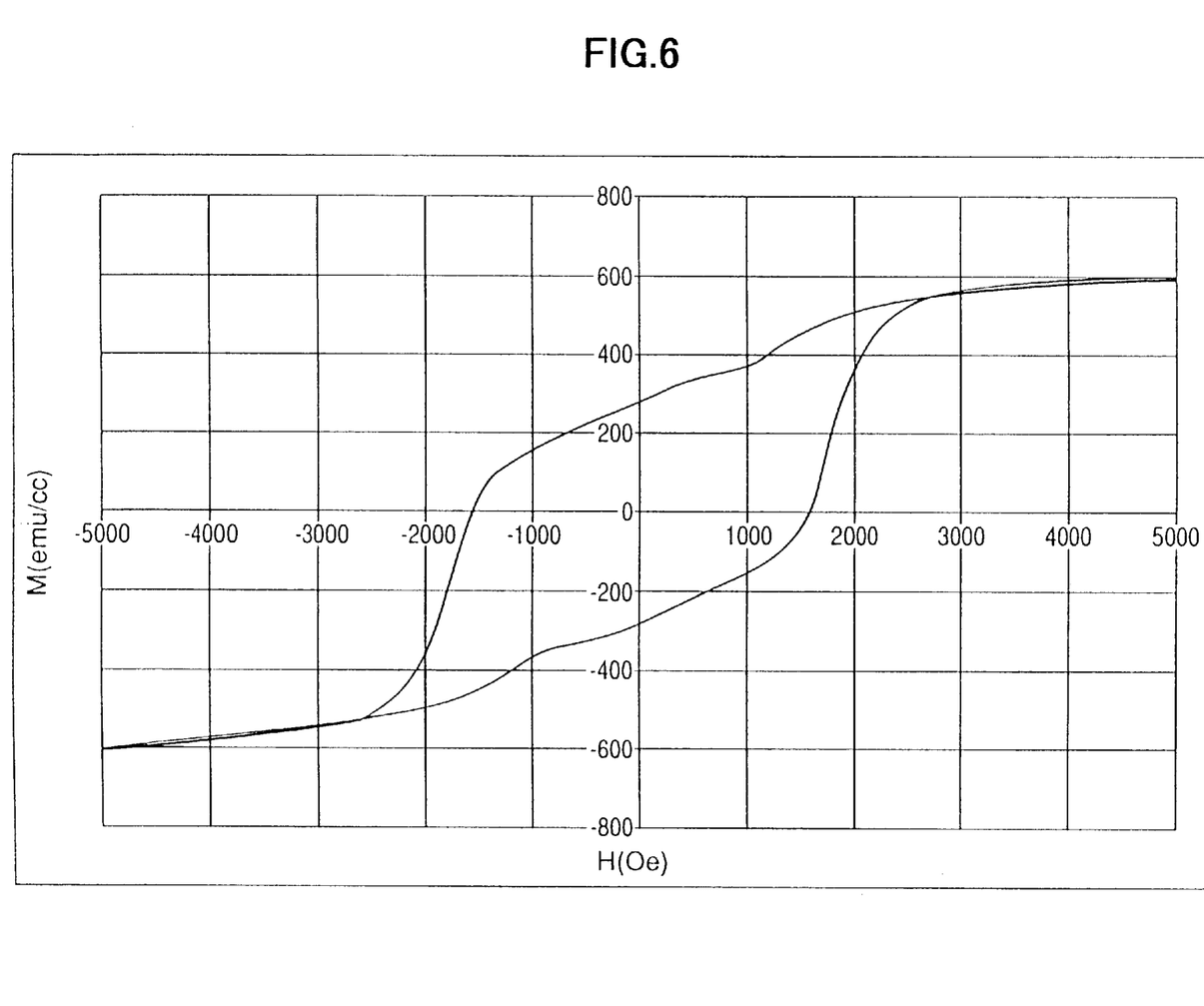
FIG. 6 is a diagram showing an in-plane magnetization curve two CoCrPt layers separated by a Ru having a thickness of 0.8 nm.

FIG. 6 is a diagram showing an in-plane magnetization curve for two CoCrPt layers separated by a Ru having a thickness of 0.8 nm, as in the case of the second embodiment of the magnetic recording medium. In FIG. 6, the ordinate indicates the magnetization (emu/cc), and the abscissa indicates the field (Oe). As may be seen from FIG. 6, the loop shows shifts near the field which indicate the antiparallel coupling.

From FIGS. 3 and 4, it may be seen that the antiparallel coupling can be obtained by the provision of the exchange layer structure. In addition, it may be seen by comparing FIG. 5 with FIGS. 4 and 6, the non-magnetic coupling layer 8 is desirably in the range of 0.4 to 0.9 nm in order to achieve the antiparallel coupling.

Therefore, according to the first and second embodiments of the magnetic recording medium, it is possible to effectively increase the apparent grain volume of the magnetic layer by the exchange coupling provided between the magnetic layer and the ferromagnetic layer via the non-magnetic coupling layer, without sacrificing the resolution. In other words, the apparent thickness of the magnetic layer is increased with regard to the grain volume of the magnetic layer so that a thermally stable medium can be obtained, and in addition, the effective thickness of the magnetic layer is maintained since cancellation of signals especially from the bottom layers is achieved. This allows higher linear density recording that is otherwise not possible for thick media. As a result, it is possible to obtain a magnetic recording medium with reduced medium noise and thermally stable performance.

Next, a description will be given of a third embodiment of the magnetic recording medium according to the present invention. In this third embodiment, at least one of the ferromagnetic layer and the magnetic layer of the first or second embodiment described above has a granular layer structure. The granular layer structure employed in this third embodiment has ferromagnetic crystal grains uniformly distributed within a non-magnetic base material, so as to further isolate the magnetic grains.

In a case where both the ferromagnetic layer and the magnetic layer have the granular layer structure, the magnetization directions of the granular layers can be made mutually parallel or mutually antiparallel, similarly to the first and second embodiments described above, by making the non-magnetic coupling layer which is made of Ru or the like and disposed between the granular layers to have a predetermined thickness. As a result, it is possible to increase the effective volume, thereby improving the thermal stability of written bits and reducing the medium noise.

It is not essential for both the ferromagnetic layer and the magnetic layer to have the granular layer structure, and the granular layer structure may be employed for only one of the ferromagnetic layer and the magnetic layer. When using only one granular layer, it is desirable to make the magnetic layer, which forms the recording layer, to have the granular layer structure.

In this embodiment, the granular layer is magnetically exchange coupled in an opposite magnetization direction (antiparallel) to that of the other granular layer or the CoCr-based magnetic layer, so as to improve the thermal stability of the written bits. In other words, this embodiment is provided with a pinning structure for improving the thermal stability performance of the magnetic recording medium, and is also provided with the granular layer structure for further reducing the medium noise.

The granular layer structure refers to a layer structure in which ferromagnetic crystal grains are uniformly distributed within a non-magnetic base material, as taught in a Japanese Laid-Open Patent Application No.10-92637. A granular medium is obtained by applying this granular layer structure to the recording medium of the magnetic storage apparatus. In the conventional recording medium which uses a CoCr-based magnetic material for the magnetic recording layer, the Co and Cr segregations are used to promote isolation of the magnetic grains and to reduce the noise. But in the conventional recording medium, it was difficult to obtain a desired isolation state of the magnetic grains.

On the other hand, in the granular medium according to the present invention, the ferromagnetic crystal grains are positively isolated by uniformly distributing the ferromagnetic crystal grains (metal) within the base material such as $SiO_2$ (ceramic material), and thus, it is possible to realize a medium with extremely low noise.

Figure 7:
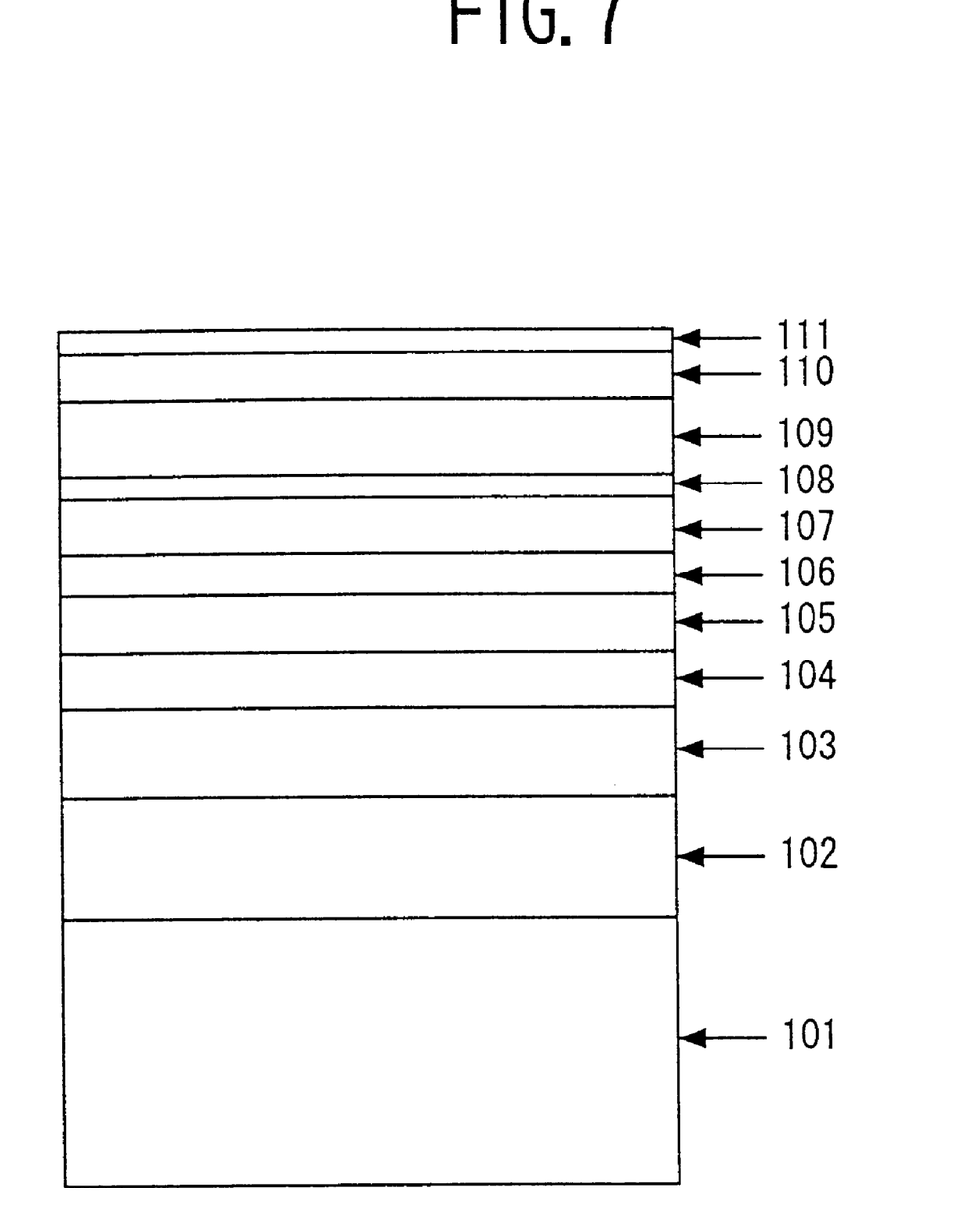
FIG. 7 is a cross sectional view showing an important part of a third embodiment of the magnetic recording medium according to the present invention.

FIG. 7 is a cross sectional view showing an important part of the third embodiment of the magnetic recording medium according to the present invention.

The magnetic recording medium includes a non-magnetic substrate 101, a first seed layer 102, a NiP layer 103, a second seed layer 104, an underlayer 105, a non-magnetic intermediate layer 106, a ferromagnetic layer 107, a non-magnetic coupling layer 108, a magnetic layer 109, a protection layer 110, and a lubricant layer 111 which are stacked in this order as shown in FIG. 7.

For example, the non-magnetic substrate 101 is made of Al, Al alloy or glass. The non-magnetic substrate 101 may or may not be mechanically textured.

The first seed layer 102 is made of NiP, for example, especially in the case where the non-magnetic substrate 101 is made of glass. The NiP layer 103 may or may not be oxidized and may or may not be mechanically textured. The second seed layer 104 is provided to promote a (001) or a (112) texture of the underlayer 105 when the underlayer 105 is made of an alloy having the B2 structure, such as NiAl and FeAl. The second seed layer 104 is made of a material similar to that of the first seed layer 102.

In a case where the magnetic recording medium is a magnetic disk, the mechanical texturing provided on the non-magnetic substrate 101 or the NiP layer 103 is made in a circumferential direction of the disk, that is, in a direction in which tracks of the disk extend.

The non-magnetic intermediate layer 106 is provided to further promote epitaxy, narrow the grain distribution width of the magnetic layer 109, and orient the anisotropy axes of the magnetic layer 109 along a plane parallel to the recording surface of the magnetic recording medium. However, it is not essential to provide this non-magnetic intermediate layer 106. This non-magnetic intermediate layer 106 is made of a hcp structure alloy such as CoCr—M, where M=B, Mo, Nb, Ta, W, Cu or alloys thereof, and has a thickness in a range of 1 to 5 nm.

The ferromagnetic layer 107 may be made of a granular layer which is formed by uniformly distributing ferromagnetic crystal grains into a non-magnetic base material. In this case, the ferromagnetic crystal grains may be made of Co, Ni, Fe, Ni-based alloys, Fe-based alloys, or Co-based alloys such as CoCrTa, CoCrPt and CoCrPt—M, where M=B, Mo, Nb, Ta, W, Cu or alloys thereof. It is preferable that the grain diameter of the ferromagnetic crystal grain is in a range of approximately 2 to 30 nm. Further, the non-magnetic base material may be made of a ceramic material such as $SiO_2$, $Al_2O_3$ and MgO or an oxide material such as NiO. On the other hand, the ferromagnetic layer 107 may be made of a CoCr-based magnetic material if not employing the granular layer structure.

The granular layer structure changes form depending on fundamental physical constants or properties, such as cohesive energy, surface energy and elastic strain energy of the ferromagnetic crystal grains and the non-magnetic base material. Accordingly, an extremely large number of combinations of the magnetic material used for the ferromagnetic crystal grains and the ceramic or oxide material used for the non-magnetic base material exist, and the combination may be appropriately adjusted to suit the needs.

It is preferable that the granular layer structure is used with priority for the magnetic layer 109, in which case the ferromagnetic layer 107 may be made of a CoCr-based magnetic material as described above. The reason for the preferable use of the granular layer structure for the magnetic layer 109 is because, due to the exchange coupling caused by the provision of the non-magnetic coupling layer 108, it is the uppermost magnetic layer 109 which contributes most to the noise reduction.

Of course, the ferromagnetic layer 107 and the magnetic layer 109 are not limited to a single-layer structure, and a multi-layer structure may be used for each of the ferromagnetic layer 107 and the magnetic layer 109.

The non-magnetic coupling layer 108 is made of Ru, Rh, Ir, Ru-based alloys, Rh-based alloys, Ir-based alloys, or the like. For example, the non-magnetic coupling layer 108 may be added with a ceramic material such as $SiO_2$ and $Al_2O_3$ or an oxide material such as NiO which are used for the granular layer proposed in a Japanese Laid-Open Patent Application No.10-149526. The addition of the ceramic or oxide material to the non-magnetic coupling layer 108 promotes the epitaxial growth of the non-magnetic coupling layer 108 and the magnetic layer 109, thereby further improving the signal-to noise (S/N) ratio of the magnetic recording medium.

The protection layer 110 and the lubricant layer 111 are similar to those of the first and second embodiments described above.

The ferromagnetic layer 107 may have a thickness in a range of approximately 2 to 10 nm, and the magnetic layer 109 may have a thickness in a range of approximately 5 to 30 nm.

In addition, the magnetization directions of the ferromagnetic layer 107 and the magnetic layer 109 may be mutually antiparallel or mutually parallel.

When making the magnetization directions of the ferromagnetic layer 107 and the magnetic layer 109 mutually antiparallel, the non-magnetic coupling layer 108 desirably is made of a material selected from a group of Ru, Rh, Ir, Ru-based alloys, Rh-based alloys and Ir-based alloys, and has a thickness in a range of approximately 0.4 to 1.0 nm.

When making the magnetization directions of the ferromagnetic layer 107 and the magnetic layer 109 mutually parallel, the non-magnetic coupling layer 108 desirably is made of a material selected from a group of Ru, Rh, Ir, Ru-based alloys, Rh-based alloys and Ir-based alloys, and has a thickness in a range of approximately 0.2 to 0.4 nm and 1.0 to 1.7 nm. Ru is desirably used for the non-magnetic coupling layer 108.

The number of exchange layer structures having the granular layer structure described above is of course not limited to one, and first and second exchange layer structures of the second embodiment described above may be provided with the granular layer structure. In this case, it is preferable that the magnetic anisotropy of the granular layer in the second exchange layer structure is set smaller than that of the granular layer in the first exchange layer structure which is disposed under the second exchange layer structure. Furthermore, it is preferable that the remanence magnetization and thickness product of the granular layer in the second exchange layer structure is set smaller than that of the granular layer in the first exchange layer structure which is disposed under the second exchange layer structure.

Figure 8:
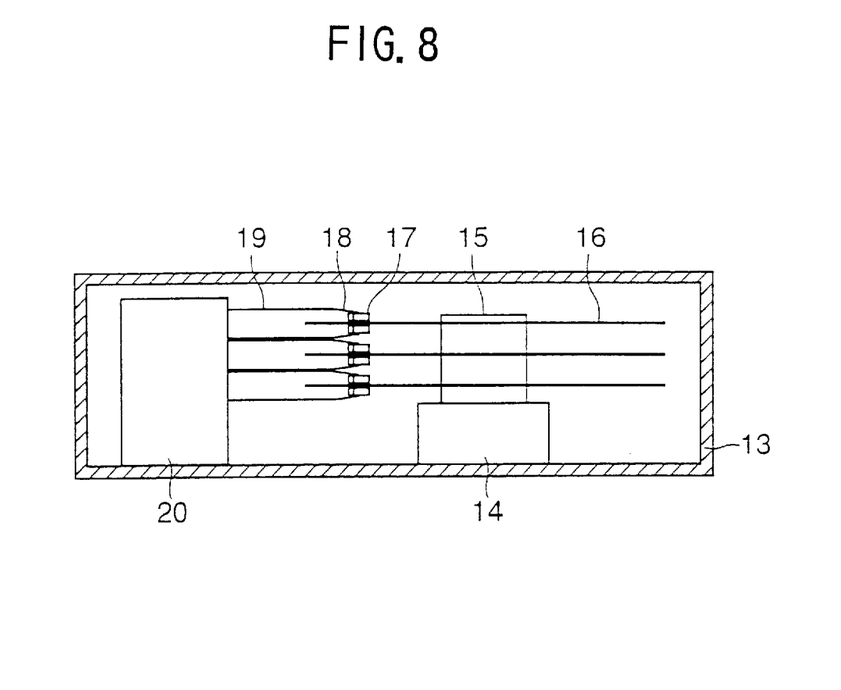
FIG. 8 is a cross sectional view showing an important part of an embodiment of the magnetic storage apparatus according to the present invention.

Next, a description will be given of an embodiment of a magnetic storage apparatus according to the present invention, by referring to FIGS. 8 and 9. FIG. 8 is a cross sectional view showing an important part of this embodiment of the magnetic storage apparatus, and FIG. 9 is a plan view showing the important part of this embodiment of the magnetic storage apparatus.

Figure 9:
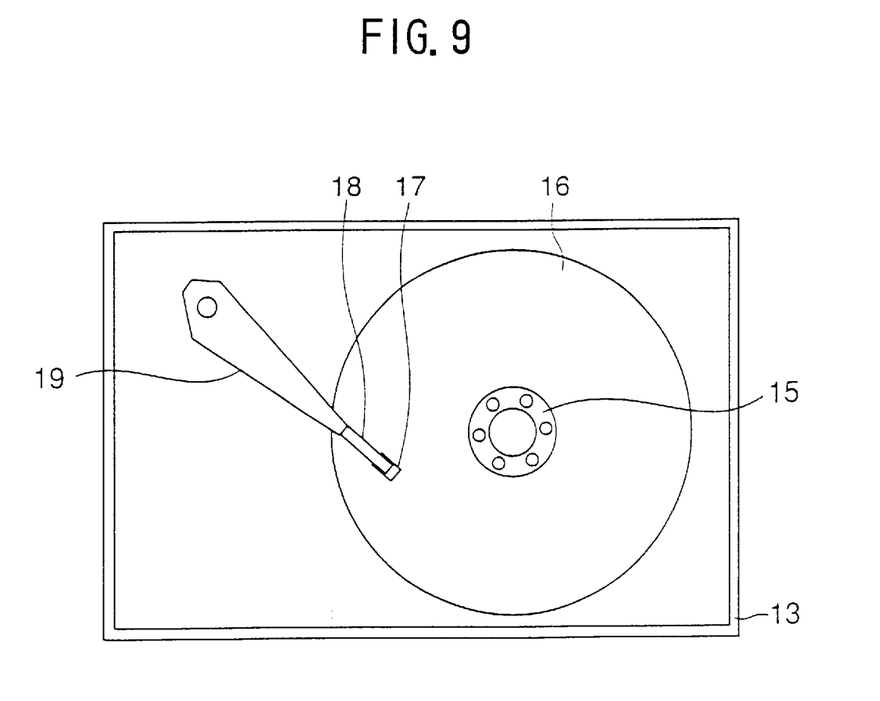
FIG. 9 is a plan view showing the important part of the embodiment of the magnetic storage apparatus.

As shown in FIGS. 8 and 9, the magnetic storage apparatus generally includes a housing 13. A motor 14, a hub 15, a plurality of magnetic recording media 16, a plurality of recording and reproducing heads 17, a plurality of suspensions 18, a plurality of arms 19, and an actuator unit 20 are provided within the housing 13. The magnetic recording media 16 are mounted on the hub 15 which is rotated by the motor 14. The recording and reproducing head 17 is made up of a reproducing head such as a MR or GMR head, and a recording head such as an inductive head. Each recording and reproducing head 17 is mounted on the tip end of a corresponding arm 19 via the suspension 18. The arms 19 are moved by the actuator unit 20. The basic construction of this magnetic storage apparatus is known, and a detailed description thereof will be omitted in this specification.

This embodiment of the magnetic storage apparatus is characterized by the magnetic recording media 16. Each magnetic recording medium 16 has the structure of the first through third embodiments of the magnetic recording medium described above in conjunction with FIGS. 1, 2 and 7. Of course, the number of magnetic recording media 16 is not limited to three, and only one, two or four or more magnetic recording media 16 may be provided.

The basic construction of the magnetic storage unit is not limited to that shown in FIGS. 8 and 9. In addition, the magnetic recording medium used in the present invention is not limited to a magnetic disk.

Further, the present invention is not limited to these embodiments, but various variations and modifications may be made without departing from the scope of the present invention.

What is claimed is:

1. A magnetic recording medium comprising:
   at least one exchange layer structure; and
   a magnetic layer provided on the exchange layer structure,
   said exchange layer structure including a ferromagnetic layer and a non-magnetic coupling layer provided on the ferromagnetic layer,
   at least one of said ferromagnetic layer and said magnetic layer having a granular layer structure in which ferromagnetic crystal grains are uniformly distributed within a non-magnetic base material, and
   further comprising at least one additional exchange layer structure provided between said exchange layer structure and said magnetic layer,
   said exchange layer structure and said additional exchange layer structure each having a granular layer structure, said additional exchange layer structure having a granular layer with a magnetic anisotropy smaller than that of a granular layer of said exchange layer structure, and the granular layers of both of said exchange layer structures having magnetization directions which are mutually antiparallel.

2. The magnetic recording medium as claimed in claim 1, wherein said ferromagnetic crystal grains are made of a material selected from the group consisting of Co, Ni, Fe, Ni alloys, Fe alloys, and Co alloys.

3. The magnetic recording medium as claimed in claim 1, wherein said non-magnetic base material is made of a material selected from the group consisting of ceramic materials and oxide materials.

4. The magnetic recording medium as claimed in claim 1, wherein said non-magnetic coupling layer is made of a material selected from the group consisting of Ru, Rh, Ir, Ru alloys, Rh alloys and Ir alloys.

5. The magnetic recording medium as claimed in claim 1, wherein said non-magnetic coupling layer is made of a material selected from the group consisting of Ru, Rh, Ir, Ru alloys, Rh alloys and Ir alloys, and has a thickness in a range of approximately 0.4 to 1.0 nm.

6. The magnetic recording medium as claimed in claim 1, which further comprises:
   an underlayer provided above a substrate;
   said ferromagnetic layer having said granular layer structure and provided above said underlayer; and
   a non-magnetic intermediate layer provided between said underlayer and said ferromagnetic layer,
   said non-magnetic intermediate layer being made of a CoCr—M alloy having a hcp structure and having a thickness of approximately 1 to 5 nm, where M=B, Mo, Nb, Ta, W, Cu or alloys thereof.

7. The magnetic recording medium as claimed in claim 6, which further comprises:
   a NiP layer provided between said substrate and said underlayer,
   said NiP layer being mechanically textured or oxidized.

8. The magnetic recording medium as claimed in claim 6, wherein said underlayer is made of an alloy having a B2 structure and selected from the group consisting of NiAl and FeAl.

9. The magnetic recording medium as claimed in claim 1, wherein said ferromagnetic crystal grains are made of a material selected from the group consisting of CoCrTa, CoCrPt and CoCrPt—M, where M=B, Mo, Nb, Ta, W, Cu or alloys thereof.

10. The magnetic recording medium as claimed in claim 1, wherein said ferromagnetic crystal grains are made of a material selected from the group consisting of Co, Ni, Fe, Ni alloys, Fe alloys, and Co alloys.

11. A magnetic recording medium comprising:
   at least one exchange layer structure; and
   a magnetic layer provided on the exchange layer structure,
   said exchange layer structure including a ferromagnetic layer and a non-magnetic coupling layer provided on the ferromagnetic layer,
   at least one of said ferromagnetic layer and said magnetic layer having a granular layer structure in which ferromagnetic crystal grains are uniformly distributed within a non-magnetic base material,
   wherein magnetization directions of said ferromagnetic layer and said magnetic layer are mutually parallel, and
   further wherein said non-magnetic coupling layer is made of a material selected from the group consisting of Ru, Rh, Ir, Ru alloys, Rh alloys and Ir alloys, and has a thickness in a range of approximately 0.2 to 0.4 nm, or 1.0 to 1.7 nm.

12. A magnetic recording medium comprising:
   at least one exchange layer structure; and
   a magnetic layer provided on the exchange layer structure,
   said exchange layer structure including a ferromagnetic layer and a non-magnetic coupling layer provided on the ferromagnetic layer,
   at least one of said ferromagnetic layer and said magnetic layer having a granular layer structure in which ferromagnetic crystal grains are uniformly distributed within a non-magnetic base material, and
   wherein said non-magnetic coupling layer is added with a ceramic material or an oxide material.

13. A magnetic storage apparatus comprising:
   at least one magnetic recording medium including at least one exchange layer structure, and a magnetic layer provided on the exchange layer structure,
   said exchange layer structure including a ferromagnetic layer and a non-magnetic coupling layer provided on the ferromagnetic layer,
   at least one of said ferromagnetic layer and said magnetic layer having a granular layer structure in which ferromagnetic crystal grains are uniformly distributed within a non-magnetic base material, and
   further comprising at least one additional exchange layer structure provided between said exchange layer structure and said magnetic layer,
   said exchange layer structure and said additional exchange layer structure each having a granular layer structure,
   said additional exchange layer structure having a granular layer with a magnetic anisotropy smaller than that of a granular layer of said exchange layer structure, and the granular layers of both of said exchange layer structures having magnetization directions which are mutually antiparallel.

* * * * *

UNITED STATES PATENT AND TRADEMARK OFFICE
CERTIFICATE OF CORRECTION

PATENT NO. : 6,689,495 B1
DATED : February 10, 2004
INVENTOR(S) : Sato et al.

It is certified that error appears in the above-identified patent and that said Letters Patent is hereby corrected as shown below:

Title page,
Item [56], References Cited, FOREIGN PATENT DOCUMENTS, insert

-- JP    10-040528    2/1998 --.

Signed and Sealed this

Seventeenth Day of August, 2004

JON W. DUDAS
*Acting Director of the United States Patent and Trademark Office*